July 4, 1961        R. L. TASSONI        2,991,045
SEALING ARRANGEMENT FOR A DIVIDED TUBULAR CASING
Filed July 10, 1958        2 Sheets-Sheet 1
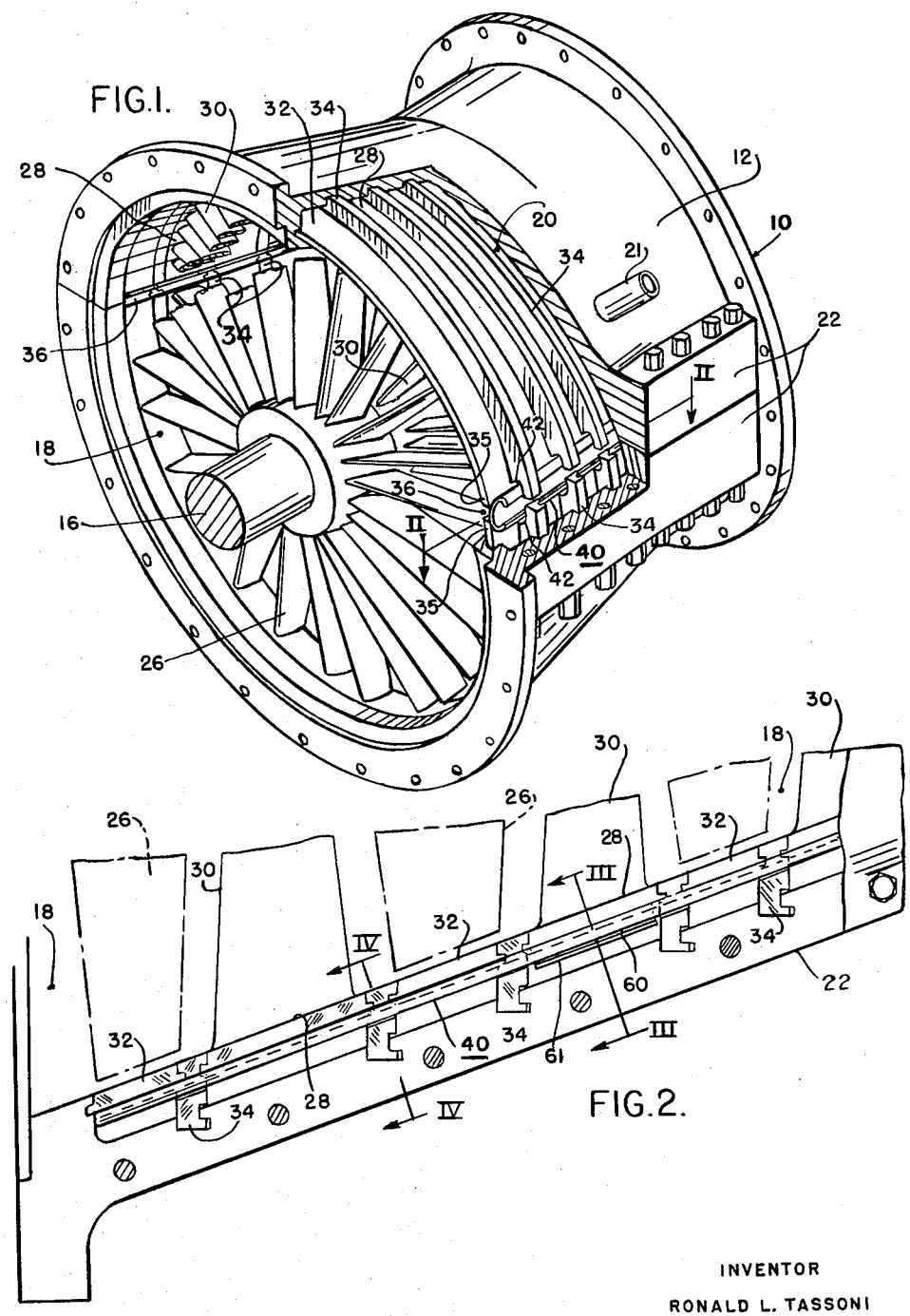
INVENTOR
RONALD L. TASSONI July 4, 1961  R. L. TASSONI  2,991,045
SEALING ARRANGEMENT FOR A DIVIDED TUBULAR CASING
Filed July 10, 1958  2 Sheets-Sheet 2

INVENTOR
RONALD L. TASSONI
BY Frank Cristiano Jr.

United States Patent Office 2,991,045
Patented July 4, 1961

2,991,045
SEALING ARRANGEMENT FOR A DIVIDED
TUBULAR CASING
Ronald L. Tassoni, Prospect Park, Pa., assignor to Westinghouse Electric Corporation, East Pittsburgh, Pa., a corporation of Pennsylvania
Filed July 10, 1958, Ser. No. 747,731
6 Claims. (Cl. 253—39)

This invention relates to a sealing device for a casing and has for an object to provide an improved sealing device for restricting fluid flow through a space that varies in size as the casing expands and contracts due to heating and cooling thereof, respectively.

In certain gas turbines inner and outer tubular casings are utilized, the inner casing comprising a plurality of pairs of axially aligned semi-circular rings supported by the outer casing and disposed with their ends in spaced juxtaposition. Thus, a pair of diametrically opposed elongated spaces are provided to accommodate expansion of the rings. Previously, the practice has been to provide a separate seal member at the part of the space formed by the adjacent ends of each pair of rings. It is another object of the present invention to provide a multiple continuous seal arrangement for each of the elongated spaces formed by all of these rings.

During operation, the inner casings of gas turbines are subjected, in many instances to a gas at a high temperature and high pressure, causing the inner casing to expand a substantial amount. However, when the gas turbine is removed from service, it must be free to contract upon cooling. Therefore, it is another object of this invention to provide a seal that will restrict fluid leakage through the aforementioned space and accommodate this thermally induced expansion and contraction.

The present invention has been incorporated in a gas turbine including an inner casing and an outer casing of tubular shape. The inner casing defines a flow path for high temperature and high pressure gases and comprises a plurality of pairs of approximately semi-circular rings, interlocked one to the other and supported in a manner permitting their thermally induced expansion and contraction. The rings include terminal portions that define a pair of diametrically opposed horizontal spaces. Upon expansion the juxtaposed terminal portions move toward each other, thereby reducing the width of the spaces.

A longitudinally extending resilient seal member of generally C-shaped cross section is provided, having a sealing surface portion in abutment with the terminal portions of the rings and straddling the space formed therebetween for restricting fluid flow therethrough. The transverse marginal portions are slidably received in grooved wall members secured to some of the rings and bias the sealing surface portion against the terminal portions of the rings.

Upon heating, the terminal portions expand and move closer to each other, thereby tending to move the sealing surface portions laterally toward the walls, but such lateral movement of the sealing surfaces is restricted by the walls. Thus, although the cross-sectional shape of the seal member tends to deform, the sealing surface portions remain in contact with the terminal portions of the rings. The grooves in the walls, however, permit the seal member to move in the longitudinal axial direction.

Upon cooling, the terminal portions contract and move farther apart from each other. Since the seal member is resilient, it tends to return to its original cross-sectional shape, thereby maintaining its sealing properties.

The foregoing and other objects are effected by the invention as will be apparent from the following description and claims taken in connection with the accompanying drawings, forming a part of this application, in which:

FIG. 1 is a perspective view of a gas turbine in which a part of the outer casing has been broken away to show the present invention;

FIG. 2 is a view taken along the line II—II of FIG. 1 and looking in the direction indicated by the arrows;

Figure 3:
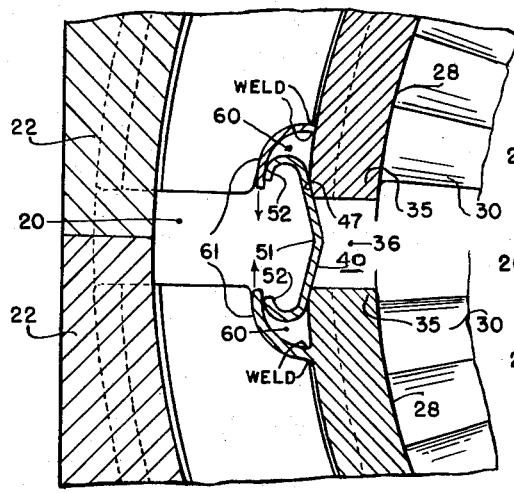
FIGS. 3 and 4 are sectional views, taken along the lines III—III and IV—IV of FIG. 2, respectively, and looking in the direction indicated by the arrows, showing the seal member in the cold position.

Referring to FIG. 1, a gas turbine 10 is illustrated comprising an outer tubular casing 12 and an inner tubular casing 14, the latter defining in conjunction with a turbine rotor 16 a motive fluid flow path 18. The casings 12 and 14 jointly define an annular chamber 20 to which is supplied, through a conduit 21, a pressurized cooling fluid from a suitable source, not illustrated, for cooling the outer casing 12 and the inner casing 14. The inner casing 14 and the outer casing 12 are each circular in cross section and are divided into a top half and a bottom half. Each half of the outer casing is provided with flanges 22 connected by suitable bolting.

The inner casing 14 encompasses a plurality of rows of rotating blades 26 supported by the rotor 16 and comprises a plurality of shroud rings 28 to which are secured stationary blades 30. Bridging rings 32 extend between the shroud rings 28 and both are supported by the outer casing 12 by being keyed to opposite sides of radially extending support rings 34 that are, in turn, keyed to the outer casing.

The shroud rings, bridging rings and support rings are divided into pairs of upper and lower semi-circular segments or half rings and their juxtaposed terminal portions 35 jointly define a pair of longitudinally extending spaces 36 disposed diametrically opposite each other. Fluid communication between the flow path 18 and the chamber 20 through the spaces 36 is restricted by seal members 40 constructed in accordance with the present invention and one of which will be hereafter described.

Figure 4:
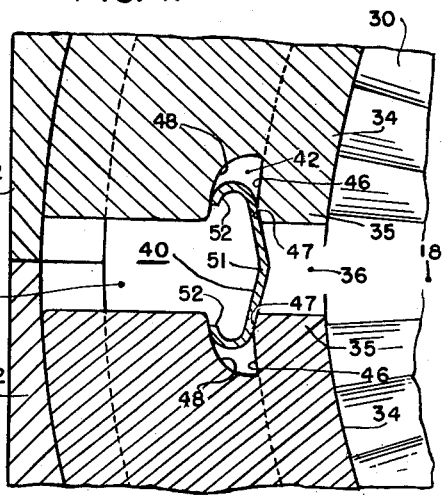
Figure 5:
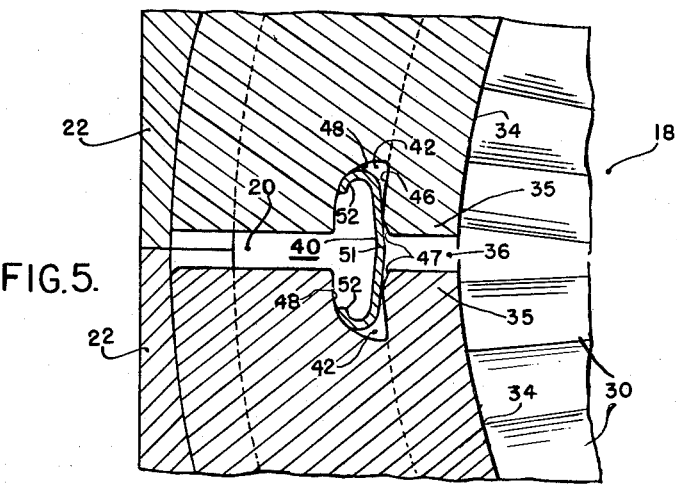
FIG. 5 is a sectional view similar to FIG. 4 but showing the seal member in the hot position.

As best illustrated in FIGS. 4 and 5, the seal member 40 is approximately C-shape in cross section and supported and biased into sealing position by grooves 42 formed in the supporting rings 34. The grooves or recesses 42 are formed by an inner arcuate wall 46 having a shape conforming to that of the adjacent shroud ring and bridging ring so that a part of the wall 46 forms, with portions of the outer walls of the shroud rings and bridging rings adjacent the space 36, continuous and longitudinally extending surfaces 47 above and below the space 36. Further, the grooves 42 are formed by an outer arcuate or approximately quarter round wall 48.

The seal member 40 is formed of flexible and resilient material of uniform thickness and comprises a longitudinally extending continuous central sealing surface portion 51 of curved shape, for example the V-shape illustrated, portions of which abut the continuous surfaces 47 at all times. The seal member 40 further includes opposed transverse marginal portions 52 of greater curvature extending from the sealing surface. The marginal portions 52 are biased by the outer wall 48 toward the continuous surfaces 47.

The seal member 40 and the grooves 42 are proportioned and arranged so that in the cold position of the inner casing, when the terminal portions 35 are farthest apart, as illustrated in FIG. 4, the central portion 51 attains its maximum curvature and the marginal portions 52 are closest to each other. In the cold position, the central portion extends substantially to the right as viewed in FIG. 4, of a vertical plane passing through the upper and lower continuous surfaces 47. Upon heating of the inner casing, and subsequent expansion incident thereto, the terminal portions move closer to each other and the continuous surfaces 47 slide along the central seal portion tending to move the seal member to the left, as viewed in FIG. 4. However, such movement is opposed by the walls 48, causing the seal member to deform and elongate in vertical direction. The grooves 42 are large enough in the vertical direction to allow the marginal portions 52 to move along the wall 48 with a camming action, thereby maintaining the central seal portion 51 in biased abutment with the continuous surfaces 47 until, as illustrated in FIG. 5, the hot position is attained.

Viewed in another light, during movement from the cold position to the hot position, the restraint upon movement to the left imposed upon the marginal portions 52 of the seal member by the walls 48 tends to pivot the former in opposite directions about longitudinal axes coincident with the surfaces at which the central sealing surfaces 51 contact the continuous surfaces 47. Thus, as viewed in FIG. 4, the upper marginal portion tends to rotate clockwise about the surface of contact between the sealing surface 51 and the upper continuous surface 47. Similarly, the lower marginal portion tends to rotate counterclockwise about the surface of contact between the sealing surface 51 and the lower continuous surface 47.

Upon cooling of the inner casing, the terminal portions 35 will tend to move farther apart, causing the continuous surfaces 47 and recesses 42 to move away from each other. However, the central sealing surface 51 is maintained in biased abutment therewith as the flexible seal member returns to its original cross-sectional shape, illustrated in FIG. 4.

It will be noted that the seal member and grooves are symmetrical about a horizontal plane. This symmetry tends to maintain the seal centered in its proper position and in sealing relation when the inner casing is in the cold position, when the inner casing is in the hot position, and during periods of transition.

By making the depth of the grooves 42 equal to the anticipated maximum vertical movement or deflection of the seal member, misalignment of the seal member in the hot position is obviated.

If desired, as illustrated in FIGS. 2 and 3, the seal member 40 may be further supported in additional grooves or recesses 60, of similar shape to grooves 42, provided by a pair of longitudinally extending retainer members 61 secured to one pair of the shroud rings 28.

In the appended claims, terms such as "above" or "below" are utilized for convenience only and are not intended as limitations.

While the invention has been shown in but one form, it will be obvious to those skilled in the art that it is not so limited, but is susceptible of various changes and modifications without departing from the spirit thereof.

What is claimed is:

1. In casing structure defining fluid pressure regions, said casing structure including an upper casing and a lower casing having juxtaposed terminal portions defining a longitudinally extending space, said terminal portions including continuous longitudinally extending surfaces adjacent said space, said terminal portions being movable toward each other in response to thermal expansion, a longitudinally extending deformable seal member straddling said space for restricting fluid flow through said space, said seal member having a longitudinally extending deformable sealing surface that is non-rectilinear in cross section and that projects in the lateral direction to one side of said continuous surfaces, said terminal portions including wall structure slidably retaining said seal member and biasing said sealing surface against said continuous surfaces and for restricting movement of said seal member in the direction opposite to said lateral direction, and said wall structure allowing movement of said seal member in the direction transverse to said lateral direction, whereby upon thermal expansion, as said terminal portions approach each other said seal member tends to straighten but remains biased by said wall structure against said continuous surfaces.

2. In casing structure defining fluid pressure regions, said casing structure including an upper casing and a lower casing having spaced terminal portions that define a longitudinally extending space, said terminal portions including continuous longitudinally extending surfaces disposed above and below said space, said terminal portions being movable toward and away from each other in response to thermal expansion and contraction of the casings, respectively, a longitudinally extending flexible seal member straddling said space for restricting fluid flow through said space, said seal member having a longitudinally extending flexible sealing surface portion that is of curved cross section and that projects laterally to one side of said continuous surfaces, said sealing member further having a pair of curved marginal portions extending from said sealing portion, said terminal portions including wall structure defining recesses, said seal member being slidably disposed in said recesses, said wall structure biasing said sealing surface against said continuous surfaces and restricting movement of said seal member in the direction opposite to said lateral direction, and said wall structure allowing movement in the direction substantially normal to said lateral direction, whereby upon thermal expansion as said terminal portions approach each other, said seal member tends to flex and straighten but remains biased by said wall structure against said continuous surfaces.

3. In tubular casing structure including an upper casing and a lower casing having spaced terminal portions that define a longitudinally extending joint, said terminal portions including continuous longitudinally extending surfaces disposed above and below said space, said terminal portions being movable toward and away from each other in response to thermal expansion and contraction, respectively, a longitudinally extending flexible and resilient seal member straddling said space for restricting fluid flow through said space, said seal member having a longitudinally extending flexible and resilient sealing surface that is substantially V-shape in cross section and that projects laterally to one side of said continuous surfaces with the apex of the V approximately centrally located between said continuous surfaces, wall structure defining a pair of opposed recesses having said seal member slidably received therein, said wall structure biasing said sealing surface against said continuous surfaces, regardless of expansion and contraction, said wall structure restricting movement in a direction transverse to the longitudinal axis and maintaining said seal member centrally positioned with respect to said space regardless of expansion of said terminal portions, and the furthest extremities of said recesses being spaced from each other a distance greater than the major cross-sectional dimension of said seal member to permit said seal member to flex and tend to flatten the V-shape as said terminal portions expand and approach each other and as said terminal portions contract and move away from each other to permit said seal member to flex and attain more curvature.

4. In an elastic fluid turbine, an outer tubular casing structure, an inner tubular casing structure defining a fluid flow path and jointly with said outer casing defining an annular chamber, said inner casing structure including an upper casing and a lower casing having juxtaposed terminal portions that define a longitudinally extending space, said terminal portions including continuous surfaces above and below said space, said upper casing and said lower casing being movable relative to each other in response to thermal expansion and contraction from a first spaced position to a second spaced position in which said terminal portions are closer to each other relative to said first position, a longitudinally extending resilient seal member for restricting fluid flow between said flow path and said chamber through said space, said seal member having a longitudinally extending central sealing surface portion of curved cross section abutting said continuous surfaces, said seal member further having opposed marginal portions connected to said central portion and extending vertically therefrom, said upper and lower casings having grooves defined by wall structure, said seal member being partially disposed in said grooves and said marginal portions engaging said wall structure for biasing said seal member into sealing relation with said continuous surfaces, said wall structure and said continuous surfaces being slidable transverse to the longitudinal axis of said seal member, said wall structure including surfaces defining said grooves that are arcuate in cross section, tending to pivot said marginal portions of said seal member in opposite directions along longitudinal axes coinciding with said continuous surfaces, whereby said central surface portion tends to straighten upon movement from said first position to said second position while remaining biased against said continuous surfaces.

5. In an elastic fluid turbine, an outer tubular casing, an inner tubular casing divided into an upper casing and a lower casing and defining a longitudinally extending fluid flow path, said inner casing comprising a plurality of pairs of interconnected segmented rings, axially spaced and radially projecting wall members interconnected to said rings, said wall members connecting said inner casing to said outer casing, said rings being spaced from said outer casing and forming therewith a longitudinally extending annular chamber, means for supplying a pressurized fluid to said chamber; each of said pairs of rings having juxtaposed terminal portions forming aligned and continuous surfaces defining a longitudinal space; said terminal portions moving from a cold position to a hot position due to thermal expansion and contraction and modifying said space, said wall members having arcuate wall surfaces defining opposed and longitudinally extending open-ended grooves adjacent said space, and a longitudinally extending flexible seal member partially disposed in said grooves for restricting fluid flow between said flow path and said chamber, said seal member having a central sealing surface and spaced marginal portions together defining substantially a C-shape in cross section, said sealing surface being in contact with said aligned continuous surfaces at all times, said marginal portions being in contact with said arcuate walls for biasing said sealing surface against said continuous surfaces and in sealing relation therewith, said arcuate walls and said continuous surfaces being slidable relative to said seal member during movement of said casings incident to thermal expansion and contraction, said arcuate walls tending to pivot the marginal portions of said seal member in opposite directions along longitudinal axes coincident with said continuous surfaces, whereby the C-shape of said seal members tends to be straightened upon decrease in width of said space and tends to become more curved upon increase in width of said space.

6. In an elastic fluid turbine, a rotor supporting rotating blades, an outer casing, an inner casing divided into upper and lower casings defining a longitudinally extending fluid flow path, said inner casing comprising divided shroud rings for supporting stationary blades, divided bridging rings encompassing said rotating blades, and divided supporting rings to which are secured on opposite sides one of said shroud rings and one of said bridging rings; said shroud rings and said bridging rings being spaced from said outer casing and forming therewith a longitudinally extending annular chamber, means for supplying a pressurized fluid to said chamber; each of said rings including juxtaposed terminal portions forming a continuous longitudinal space, wall structure comprising inner and outer wall surfaces defining rows of longitudinally extending grooves having opposed access openings adjacent said space, said terminal portions also forming longitudinal continuous surfaces on opposite sides of said spaces, and an integral longitudinally extending resilient seal member disposed between said terminal portions, said seal member having a curved central sealing surface portion and curved marginal portions together forming a C-shape in cross section, said seal member having said marginal portions disposed in said grooves and in slidable abutment with said outer walls, and said central sealing portion being disposed in slidable abutment with said aligned continuous surfaces, thereby allowing movement of said terminal portions due to thermal expansion and contraction, said central portion extending to the side of said continuous surfaces opposite the side on which said outer walls are disposed when cold, said outer walls tending to pivot said marginal portions in opposite directions along longitudinal axes coinciding with said continuous surfaces while maintaining said central sealing surface biased against said continuous surfaces, whereby the C-shape of said seal member tends to be elongated upon movement from said cold position to said hot position and tends to become constricted upon movement from said hot position to said cold position.

References Cited in the file of this patent
UNITED STATES PATENTS

| | | |
|---|---|---|
| 2,815,645 | Downs | Dec. 10, 1957 |
| 2,848,156 | Oppenheimer | Aug. 19, 1958 |

FOREIGN PATENTS

| | | |
|---|---|---|
| 510,505 | Great Britain | Aug. 2, 1939 |